United States Patent [19]

Haas

[11] 4,218,647
[45] Aug. 19, 1980

[54] VOLTAGE REGULATOR WITH CURRENT LIMITING CIRCUITRY

[75] Inventor: Frank J. Haas, Harper Woods, Mich.

[73] Assignee: Burroughs Corporation, Detroit, Mich.

[21] Appl. No.: 955,241

[22] Filed: Oct. 27, 1978

[51] Int. Cl.² ............................................. G05F 1/58
[52] U.S. Cl. .......................................... 323/9; 361/18
[58] Field of Search ................. 323/9, 20, 17, DIG. 1; 363/50, 56; 361/18

[56] References Cited

U.S. PATENT DOCUMENTS

| | | | |
|---|---|---|---|
| 3,768,012 | 10/1973 | Wilkinson | 323/9 X |
| 3,930,194 | 12/1975 | Walker | 363/56 |
| 3,978,393 | 8/1976 | Wisner et al. | 363/19 X |
| 3,984,755 | 10/1976 | Lehnhoff et al. | 361/18 X |
| 4,021,701 | 5/1977 | Davies | 361/18 |
| 4,128,866 | 12/1978 | Doerre | 363/56 X |

OTHER PUBLICATIONS

Regulating PWM Technical Specification, Silicon General Inc., Model No. SG1524.

*Primary Examiner*—J. D. Miller
*Assistant Examiner*—Peter S. Wong
*Attorney, Agent, or Firm*—Delbert P. Warner; William M. Hanlon, Jr.; Carl Fissell, Jr.

[57] ABSTRACT

Voltage regulator having current limiting circuitry. The voltage regulator includes an operational amplifier which has a substantially high output impedance and is disposed in a negative feedback configuration to provide an output signal which is the difference between a reference voltage input and the magnitude of the output voltage of the voltage regulator. Overcurrent detection circuitry is connected to the output of the operational amplifier and provides an on or off signal whenever the magnitude of the current drawn by a load exceeds a predetermined magnitude. When the magnitude of the load current exceeds a predetermined magnitude, the output of the overcurrent detection circuitry will be a low level signal which clamps or draws down the magnitude of the output voltage of the operational amplifier towards ground potential. A resistor-capacitor series circuit connected between ground and the output of the operational amplifier integrates the digital signal and provides an analog signal proportional to the average magnitude of the output voltage of the operational amplifier. A portion of the magnitude of the analog signal is fed back through a resistor to the gain of the operational amplifier and cause the output voltage of the operational amplifier to be linearly reduced which, in turn, through the power amplification controlling circuitry of the voltage regulator linearly reduces the output current of the voltage regulator until the overcurrent condition is eliminated.

4 Claims, 5 Drawing Figures

FIG.2.

VOLTAGE REGULATOR WITH CURRENT LIMITING CIRCUITRY

CROSS-REFERENCE TO RELATED APPLICATION

Certain of the subject matter disclosed, but not claimed herein, is set forth and claimed in copending application, Ser. No. 955,253, filed Oct. 27, 1978, Assignee Docket No. 21-1305, in the name of D. Wisner and T. Schmalzriedt, and assigned to the assignee of the present application.

BACKGROUND OF THE INVENTION

1. Field of the Invention

This invention relates, in general, to voltage regulators and, more specifically, to voltage regulators having current limiting circuitry.

2. Description of the Prior Art

Voltage regulators are commonly used to provide a constant output voltage to power various electronic devices. Typically, such voltage regulators operate on the technique of pulse width modulation wherein the conduction time of switch control elements is varied in proportion to the magnitude of the output voltage of the regulator so as to control the amount of energy transferred to an output transformer and thereby maintain the magnitude of the output voltage at a constant level.

Such voltage regulators are also provided with current limiting capabilities which protect the switch elements and the electronic devices from overcurrent conditions. As shown in U.S. Pat. No. 3,978,393, which is assigned to the assignee of the present application, current limiting capability for a voltage regulator is provided by a differential input comparator which detects an overcurrent condition and generates a control signal which terminates the supply of power to the switching elements of the voltage regulator. Although such a current limiting arrangement is effective to protect the voltage regulator and the electronic utilization devices, it would be more desirable to provide a voltage regulator having current limiting capabilities wherein the output current of the voltage regulator is linearly reduced until the overcurrent condition is removed.

SUMMARY OF THE INVENTION

There is disclosed herein a voltage regulator for electronic apparatus having improved overcurrent limiting circuitry. The voltage regulator includes a differential input operational amplifier having a substantially high output impedance. The non-inverting input of the operational amplifier is connected to a reference voltage supply circuit; while the inverting input of the operational amplifier is connected to the output of the voltage regulator such that the operational amplifier provides an output signal which is the difference between the two inputs. The output of the operational amplifier is fed to a power amplifier controlling circuit which provides pulse width modulation of the conduction time of switching elements so as to control the amount of power supplied to an output transformer and thereby maintain the magnitude of the output voltage of the regulator at a constant value.

Overcurrent detection means are provided which include a comparator having on and off states indicative of the magnitude of the current drawn by a load. When the current drawn by the load exceeds a predetermined maximum value, the output of the comparator, which is connected to the output of the operational amplifier, will be a low level signal which clamps or drags down the magnitude of the output voltage of the operational amplifier towards ground potential. A resistor-capacitor series network, connected between the output terminal of the operational amplifier and ground, effectively integrates the magnitude of the output voltage of the operational amplifier and provides an average magnitude therefor. A portion of this average output voltage magnitude is fed back to the input of the operational amplifier through negative feedback means connected therebetween so as to modify the gain of the operational amplifier. In this manner, the magnitude of the output voltage of the operational amplifier is linearly reduced which, through the power amplifier control circuitry, causes the magnitude of the output current of the voltage regulator to be linearly reduced to a level sufficient to eliminate the overcurrent condition.

The voltage regulator constructed according to the teachings of this invention provides improved current limiting capabilities over prior art voltage regulators. In one aspect of this invention, the magnitude of the output current of the voltage regulator is linearly reduced when current exceeding a predetermined maximum is drawn by a load. Such a current limiting capability is more desirable than the current limiting circuitry utilized in prior art voltage regulators which merely provide an off signal which terminates the supply of power to the switching elements of the voltage regulator. Further, the improved current limiting capabilities are achieved with a minimum number of components since the resistor-capacitor series network, which averages the magnitude of the output voltage of the operational amplifier, also functions as a compensation network for stabilizing the operation of the operational amplifier. By utilizing an operational amplifier having a substantially high output impedance in a negative feedback configuration, the output voltage of the operational amplifier can be linearly reduced instead of oscillating between on and off states as occurs with conventional operational amplifiers having a low output impedance.

BRIEF DESCRIPTION OF THE DRAWING

The various features, advantages and other uses of this invention will become more apparent by referring to the following detailed description and drawing, in which.

DESCRIPTION OF THE PREFERRED EMBODIMENT

Throughout the following description, identical reference numbers are utilized to refer to the same component shown in all figures of the drawing.

Figure 1:
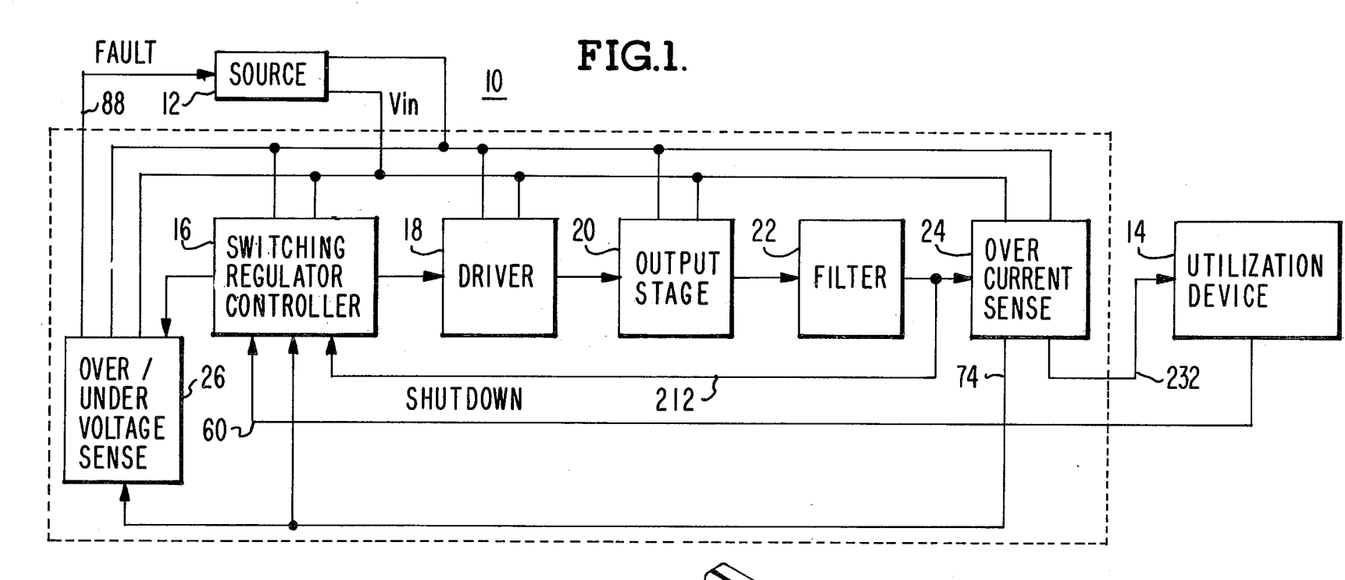
FIG. 1 is a block diagram of a voltage regulator constructed according to the teachings of this invention.

Referring now to the drawing, and to FIG. 1 in particular, there is shown a voltage regulator 10 constructed according to the teachings of this invention. The voltage regulator 10 receives an unregulated voltage from a suitable source 12, such as a power supply, and converts it to a regulated D.C. output voltage for use by utilization devices 14, which typically are electronic circuits. Although the voltage regulator 10 is described as receiving a D.C. input voltage having a magnitude of ±24 volts and provides an output voltage of +5 volts, it will be understood that voltage regulators constructed according to the teachings of this invention may also receive A.C. or D.C. input volts of any suitable magnitude and, further, may provide different magnitudes of D.C. output voltage.

Voltage regulator 10 includes a switching regulator controller 16 which provides pulses to the driver stage 18 at a suitable frequency, such as 20 kHz., with the width of each pulse determining the amount of energy delivered to the driver stage 18. Switching regulator controller 16 is responsive to the magnitude of the output voltage and varies the pulse width of the pulses accordingly so as to maintain the magnitude of the output voltage at a constant level. The driver stage 18 includes an energy storage means, such as a transformer, which is periodically connected to the voltage source 12 by switch devices, such as transistors. The switch devices are switched between conductive and non-conductive state by the pulses from the switching regulator controller 16 and thereby determine the amount of energy transferred to the driver transformer.

The voltage regulator 10 further includes an output stage 20 consisting of output switch devices and an output transformer. The output switch devices are connected to the secondary windings of the driver transformer and, when driven to the conductive state, connect the output transformer to the voltage source 12 thereby allowing a predetermined amount of energy to be transferred to the output transformer. The output from the output transformer is passed through a suitable filter 22 which removes the ripple from the output signal in order to provide a D.C. output voltage of a desired magnitude. The output from the filter 22 is carried to an overcurrent sense circuit 24 which compares the output of the voltage regulator 10 with the precisely regulated reference signal and senses when an overcurrent condition exists. The overcurrent sense circuitry 24 provides a signal to the switching regulator controller 16 which, in turn, linearly reduces the output voltage of the voltage regulator 10 through the driver and output stages 18 and 20, respectively, until the overcurrent condition is removed. The voltage regulator 10 further includes over/under voltage sense circuitry 26 which compares the output of the voltage regulator 10 with a precise reference signal and provides a signal to the voltage source 12 indicating whenever the output of the voltage regulator 10 has not reached the desired magnitude.

Figure 2:
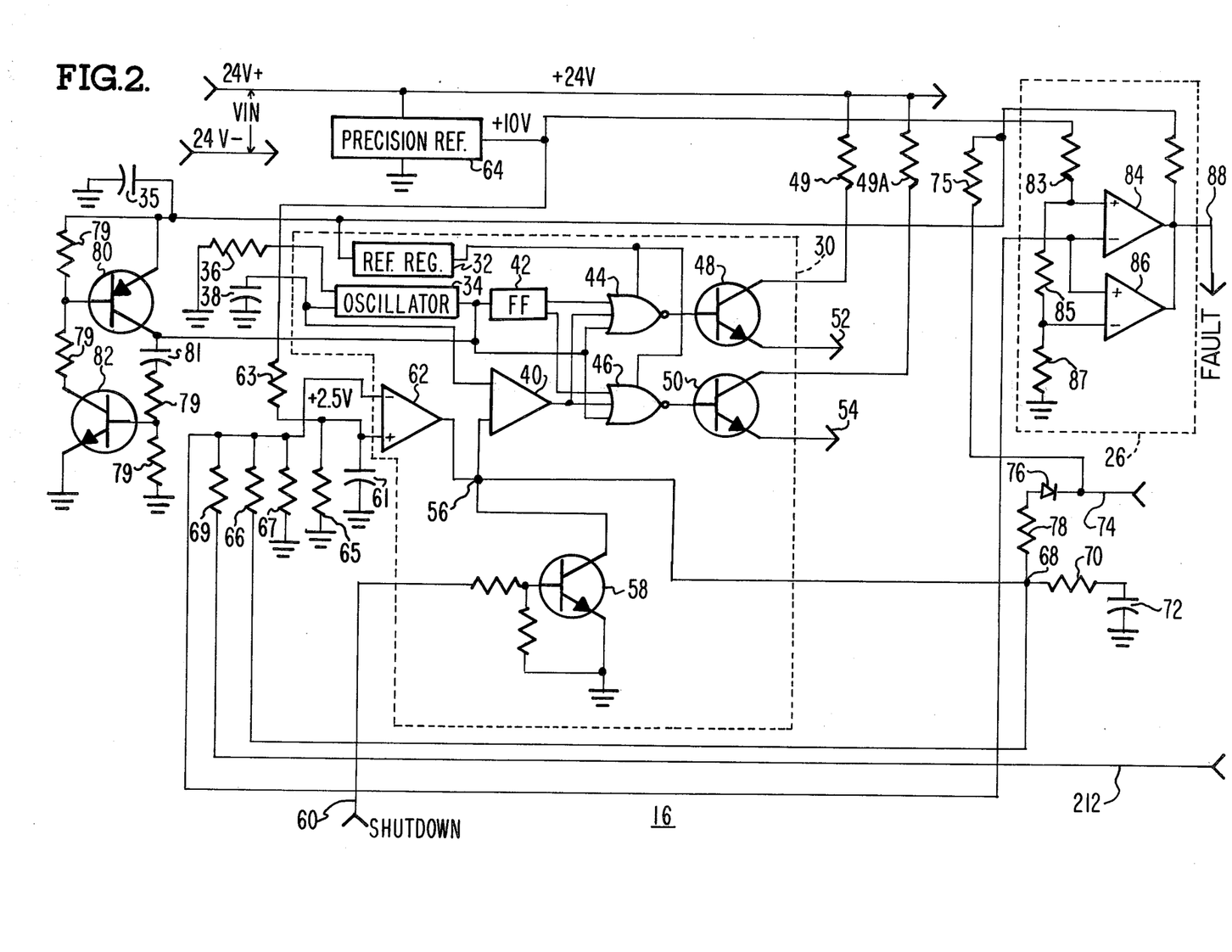
FIG. 2 is a detailed schematic diagram of the switching regulator control and over/under voltage sense circuit shown in FIG. 1.

Referring now to FIG. 2, there is shown a detailed schematic diagram of the switching regulator controller 16. The switching regulator controller 16 includes a pulse width modulator circuit 30 which may be constructed of individual components or may be a single integrated circuit chip, such as Model No. SG1524 marketed by Silicon General, Inc., Westminster, Calif. The pulse width modulator circuit 30 includes a reference regulator 32 which provides a +5 volt reference signal that is utilized to drive the other elements of the pulse width modulator 30. The pulse width modulator 30 includes an oscillator 34 which uses resistor 36 to establish a programmable current into a current mirror circuit which, in turn, charges capacitor 38, thereby providing a linear ramp voltage which is used as the time base signal by comparator 40. The output of the oscillator 34 is an input to flip flop 42 whose output pulse width is fixed at 50% of the 20 kHz. frequency, due to the flip flop complementing and the division of the oscillator frequency by 2. The output of flip flop 42 is an input to NOR gates 44 and 46 and alternately triggers one of the NOR gates 44 or 46 on. The other inputs to the NOR gates 44 and 46 include the output of oscillator 34 and the output of the width modulation comparator 40. The outputs of NOR gates 44 and 46 are respectively connected to the base of transistors 48 and 50, respectively. The collectors of the transistors 48 and 50 are connected through suitable dropping resistors 49 and 49A to the +24 volt supply. Thus, when the input conditions to one of the NOR gates 44 or 46 is satisfied, the output of the NOR gate will supply base current through the respective one of transistors 48 and 50, thereby gating the transistor 48 or 50 on and allowing energizing current to flow from the +24 volt supply, through the transistor 48 or 50, to the driver stage 18 of the voltage regulator 10 by conductors 52 and 54 which are respectively connected to the emitters of the transistors 48 and 50. According to the teachings of this invention, the flip flop 42 alternately triggers NOR gates 44 and 46 on, thereby gating transistors 48 and 50 to the conductive state on alternating cycles of the 20 kHz. frequency output signal of the oscillator 34.

As described above, the capacitor 38 provides a ramp signal to one input of comparator 40. The other input of the comparator 40 is from junction 56 which is connected to the collector of a transistor 58 which, when triggered to the conductive state by a shut-down signal on conductor 60 from the utilization devices 14, connects the common junction 56 to ground and thereby deactivates the voltage regulator 10. The common junction 56 is also connected to the output of amplifier 62. The amplifier 62 is a differential input, transconductance amplifier having a relatively high output impedance, on the order of a few megaohms. The noninverting (+) input such as a few milleohms, of the amplifier 62 is connected to a +10 volt supply provided by a precision reference circuit 64 which essentially includes a zener diode and precision trimmed resistors to provide a precise reference voltage. According to the teachings of this invention, the +10 voltage is divided to 2.5 volts by two precision resistors 63 and 65. The inverting input (−) of the amplifier 62 is connected by resistor 69 and conductor 212 to the output of the filter stage 22. A compensation network, including series resistor 70 and capacitor 72, is connected to the output of the amplifier 62 of the pulse width modulator circuit 30 at junction 68 in order to control the frequency and phase response of the error amplifier 62. The output of the overcurrent sense circuit 24, described in detail hereafter, is connected via conductor 74 and a series diode 76 and resistor 78 circuit to the common junction 68 at the output of amplifier 62 of the pulse width modulator circuit 30, and provides a signal indicating the existence of an overcurrent condition which forces the output of amplifier 62 in the direction of ground.

In operation, variations in the magnitude of the output voltage of the regulator 10 will be reflected at the inverting (−) input of amplifier 62. The output of amplifier 62 will vary in accordance with the changed input conditions and, in turn, will change the input to comparator 40. As comparator 40 compares the output of amplifier 62 with the sawtooth waveform from capacitor 38, a change in the output of amplifier 62 will cause a corresponding change in the output of comparator 40 which will vary the length of time the magnitude of the output of comparator 40 is in the true or on input state to the NOR gates 44 and 46. Thus, the length of time transistor 48 or 50 is conducting wil be changed in order to vary the amount of energy supplied to the driver stage, as described in detail hereafter, and thereby return the output voltage of the regulator 10 to the desired magnitude.

The switching regulator controller 16 also includes transistors 80 and 82 which are arranged in a single shot configuration so as to provide a minimum clock pulse width, typically 5 microseconds, which prevents transistors 48 and 50 of the pulse width modulator circuit 30 from being in the conductive state at the same time. In addition, the inverting (−) input of amplifier 62 is connected to the inputs of comparators 84 and 86 of the over/under voltage sense circuitry 26. The comparators 84 and 86 compare the output of the regulator 10 with a precise reference voltage from the precision reference 64 and thereby provide at their output 88 a signal which is an indication of over/under voltage. This signal 88, labelled FAULT, is fed to the voltage source 12 and indicates when the output of the regulator 10 is not up to the desired magnitude such that the voltage source 12 may deenergize the voltage regulator 10 and prevent damage to the utilization devices 14 connected thereto.

Figure 3:
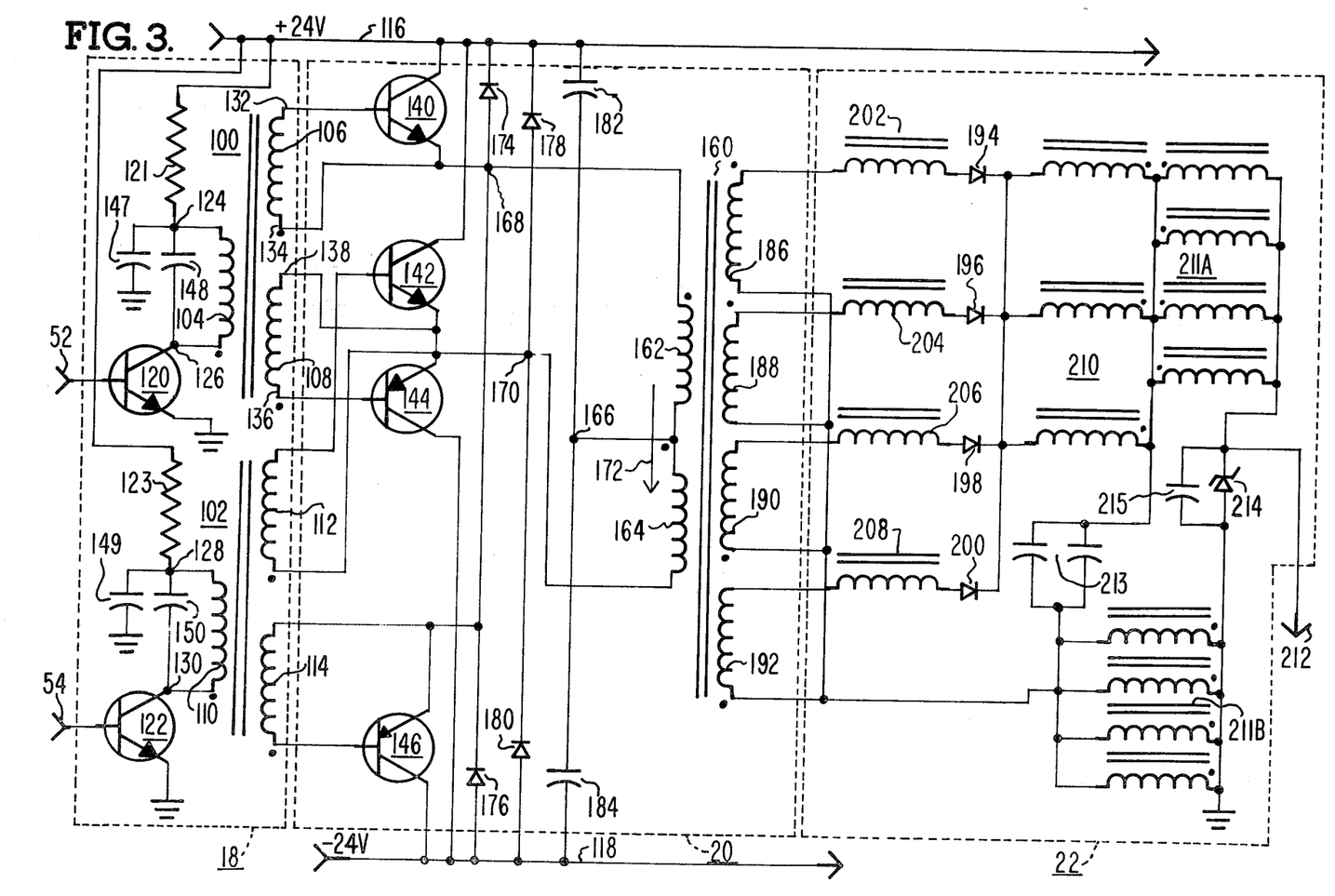
FIG. 3 is a detailed schematic diagram of the driver, output and filter circuits shown in FIG. 1.

Referring now to FIG. 3, there is shown a detailed schematic diagram of the driver stage 18, the output stage 20 and the filter stage 22 of the voltage regulator 10. The driver stage 18 includes first and second driver transformer means 100 and 102, respectively, each having a single primary and first and second secondary windings inductively coupled around a magnetic core, such as primary winding 104 and secondary windings 106 and 108 on driver transformer 100 and primary winding 110 and secondary windings 112 and 114 of the second driver transformer 102. The driver stage 18 further includes first and second switch means 120 and 122, respectively, which are typically transistors. The transistors 120 and 122 have their base terminals connected by conductors 52 and 54, respectively, to the emitters of transistors 48 and 50, respectively, in the pulse width modulation circuitry 30 of the switching regulator controller 16, shown in FIG. 2, and are switched between conductive and non-conductive states by the pulses generated by the pulse width modulation circuitry 30. As indicated previously, the transistors 48 and 50 are triggered into the conductive state on alternate cycles of oscillator 34 output. Although two separate driver circuits are illustrated, each including a driver transistor and a driver transformer, it will be understood that the teachings of this invention are equally applicable to voltage regulators having single driver stages comprising a single driver switch means and a single driver transformer.

As shown in FIG. 3, the first end of each primary winding of the driver transformers, such as first end 124 of primary winding 104 and first end 128 of primary winding 110 is connected through a resistor to the positive supply voltage conductor 116. The second end of each primary winding, such as second end 126 of primary winding 104 and second end 130 of primary winding 110 is connected to the collector of the associated driver transistor, such as driver transistors 120 and 122, respectively. The emitters of the driver transistors 120 and 122 are connected to ground such that when the transistors 120 and 122 are triggered to the conductive state by the pulse width modulation circuitry 30, shown in FIGS. 1 and 2, the primary windings 104 and 110 of the driver transformers 100 and 102, respectively, are connected between the supply voltage and ground, thereby causing an energizing current to flow through the respective primary windings. Each drive transformer 100 and 102 has associated therewith first and second secondary windings, such as secondary windings 106 and 108 of driver transformer 100 and secondary windings 112 and 114 of driver transformer 102. The secondary windings are each associated with an output switch means in the output stage 20 of the voltage regulator 10, as described hereafter.

The output stage 20 of the voltage regulator 10 includes output switch means 140, 142, 144 and 146, each associated with one of the secondary windings of the driver transformers 100 and 102. According to the preferred embodiment of this invention, the output switch means 140, 142, 144 and 146 are transistors with switch means 140 and 142 being NPN-type transistors and switch means 144 and 146 being PNP-type transistors. Since the connections between the output switch means 140 and 144 and the secondary windings 106 and 108 of the first driver transformer 100 are identical to the connections between the output switch means 142 and 146 and the secondary windings 112 and 114 of the second driver transformer 102, the following description will depict the connection and operation of the output switch means 140 and 142 and the first driver transformer 100; it being understood that similar connections exist for the remaining output switch means and the second driver transformer 102. Accordingly, the base of output transistor is connected to the first end 132 of the first secondary winding 106 of driver transformer 100. The collector of output transistor 140 is connected to the positive voltage supply conductor 116 and the emitter is connected to the second end 134 of the secondary winding 106 of the driver transformer 100. Similarly, the base of the second output transistor 144 is connected to the second end 136 of the secondary winding 108 of the first driver transformer 100 with the emitter of transistor 144 connected to the first end 138 of the secondary winding 108 and the collector connected to the negative voltage supply conductor 118.

In operation, when driver transistor 120 is gated to the conductive state by pulses on conductor 52 from the pulse width modulation circuitry 30, shown in FIGS. 1 and 2, the primary winding 104 of the first driver transformer 100 will be connected between the positive supply voltage and ground, thereby causing energizing current to flow in the primary which induces a current in the secondary windings 106 and 108 of the driver transformer 100. The secondary current supplies base current to output transistors 140 and 144, thereby triggering the output transistors 140 and 144 into conduction and allowing energizing current to flow into the output transformer means, as described in detail hereafter. When the driver transistor 120 is gated to the non-conductive or off state, the primary and secondary magnetic fields of the driver transformer 100 will collapse.

As is well known, transistors have associated therewith a stored base charge when the transistors are turned off from the conductive or on state. This stored base charge hinders or slows down the turn-off time of such transistors. According to a novel aspect of this invention, the stored base charge on the output transistors is removed, thereby decreasing the turnoff time of the transistors, by adding a capacitor in parallel with the primary winding of the driver transformer, such as capacitor 148 for primary winding 104 and capacitor 150 for primary winding 110. When the driver transistor 120 is turned ON, capacitor 148 is immediately charged and the magnetizing current starts to flow in the primary winding of the driver transformer 100; thereby building up flux. When the driver transistor is turned OFF, i.e., the transistor current has reached zero, a reversal of the polarity of the primary and secondary windings of the driver transformer 100 occurs. The current path for the decay of the flux stored in the driver transformer 100 is through the capacitor 148 in the primary and the base-emitter junction of the output transistors 140 and 144 in the secondary. Since the capacitor effectively short circuits the primary, little dissipation takes place in the primary circuit. The principal path for decay of the magnetization flux is in the secondary circuit where the power dissipation occurs as a result of the immediate reversal of the winding voltage and the current flow due to the removal of the stored base charge from the output transistors. Thus, the energy stored in the driver transformer utilized to remove the stored base charge from the output transistors which thereby decreases the turnoff time of the output transistors and produces a more efficient voltage regulator.

In the prior art, it is known to utilize a resistor and capacitor series circuit in parallel with the primary winding of the driver transformer; however, such an RC network is intended for an entirely different purpose, namely, damping, and does nothing to reduce the stored base charge of the output transistors. In the present invention, no series resistor is required since the capacitor effectively removes the stored base charge of the output transistors at a greater rate than in the prior art devices. Other attempts to remove the stored base charge of the output transistors have also been made and include various diode and tapped winding arrangements which prevent the output transistors from being driven hard into saturation. However, such an arrangement reduces the efficiency of the regulator since power is wasted by not driving the output transistors hard into saturation.

The output stage 20 of the voltage regulator 10 also includes an output transformer 160 having first and second primary windings 162 and 164, respectively, and a plurality of secondary windings, 186, 188, 190 and 192 inductively coupled with a magnetic core. The primary windings 162 and 164 are wound in a first polarity direction and have one end connected together to form a common junction, indicated by reference number 166. The first end of the first primary winding 162 is connected to junction 168 formed by the connection of the emitters of output transistors 140 and 146. The other end of the second primary winding 164 is connected to junction 170 formed by the connection of the emitters of output transistors 142 and 144. Thus, when the output transistors 140 and 144 are gated to the conductive state, as described above, the primary windings 162 and 164 of the output transformer 160 are connected between the positive and negative voltage supply conductors 116 and 118, respectively, thereby causing energizing current to flow in a first direction, indicated by arrow 172, through the primary windings 162 and 164 of the output transformer 160. Similarly, when output transistors 142 and 146 are gated into the conductive state by driver transistor 122, the primary windings 162 and 164 will be connected between the positive and negative voltage supply conductors 116 and 118, respectively, in a reverse polarity direction, opposite that indicated by arrow 172, so as to cause energizing current to flow therethrough in an opposite direction. Clamp diodes 174 and 176 are connected between junction 168 and the positive and negative voltage supply conductors 116 and 118; while clamp diodes 178 and 180 are connected between junction 170 and the positive and negative voltage supply conductors 116 and 118, respectively, so as to protect the output transistors from reverse transient voltages when the output transistors are turned off.

Since it is known that transistors possess unequal switching characteristics, the triggering of the output transistors into the conductive state in pairs causes transient voltages to be produced which generate noise and affects the reliable operation of the voltage regulator 10 and the utilization devices 14. In order to substantially reduce the noise generated by the differences in the switching times of the output transistor pairs, the primary and secondary windings of the output transformer 160 are each wound in a bifiliar configuration, i.e., each winding is wound two turns at a time around the magnetic core. Further, the primary and secondary windings are wound at the same time in a quadfiliar fashion such that adjoining groups of turns of the primary windings are separated by groups of two turns of the secondary windings. This arrangement substantially increases inductive coupling between the primary and secondary windings which reduces leakage inductance; thereby improving the efficiency of the output transformer by minimizing transient noise generation.

According to another novel aspect of this invention, first and second capacitance means 182 and 184, respectively, are respectively connected between the common junction 166 of the primary windings 162 and 164 of the output transformer 160 and the positive and negative voltage supply conductors 116 and 118. This arrangement creates a virtual ground at the common junction 166 between the first and second primary output windings 162 and 164. The capacitors 182 and 184 supply sufficient electrical energy so as to maintain current flow into the junction 166 equal to the current flowing out of the junction 166. This arrangement was found to equalize the transient switching voltages caused by the differences in the switching times of the output transistors pairs, thereby significantly reducing the noise generated in the switching regulator 10.

The flow of energizing current through the primary windings 162 and 164 of the output transformer 160 induces a current in secondary windings 186, 188, 190 and 192. As shown in FIG. 3, secondary windings 186 and 188 are wound in an opposite polarity direction from secondary windings 190 and 192. One end of each secondary winding is connected together; with the other end of each secondary winding being connected to the anode of diode means 194, 196, 198 and 200, respectively. The cathodes of each diode means 194, 196, 198 and 200 are connected together to form two parallel, full-wave, center-tapped rectifiers that rectify the output voltage of the output transformer 160. According to the preferred embodiment of this invention, each diode means 194, 196, 198 and 200 are formed of Schottky diodes which possess low forward voltage drop at high currents in conjunction with relatively low 125° C. maximum junction operating temperatures. In order to keep the junction temperature of the Schottky diodes within limits despite the high current in the present application, four secondary windings 186, 188, 190 and 192 are utilized. It will be understood that other applications involving lower currents than that of the present application would not necessarily require four secondary output windings.

Figure 5:
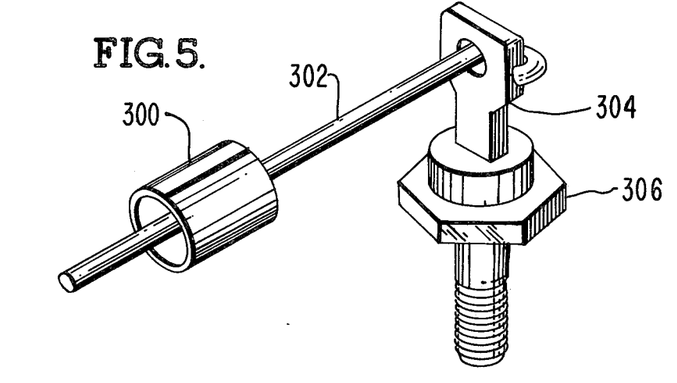
FIG. 5 is a perspective view of the reverse overvoltage protection means for the Schottky diodes utilized in this invention.

It is known that Schottky diodes have a failure mode when a high reverse voltage exceeding the maximum rise time limit of the Schottky diode is applied thereto. The maximum rate of change (dv/dt) limit, typically 700 volts/microsecond, may be exceeded when current flow through the output transformer secondary winding reverses polarity direction. It is normal practice to protect Schottky diodes from transient reverse voltages by means of a series resistor-capacitor snubber circuit connected in shunt with each Schottky diode. Although such a circuit effectively protects the Schottky diode from damaging transient reverse overvoltages, it uses a large amount of electrical energy which decreases the efficiency of the apparatus it is utilized in. It is proposed, instead, to utilize a small inductance in series with each Schottky diode in order to limit the rate of change of the reverse voltage across the diode. More preferably, the series inductance is provided in the form of hollow sleeve or shielding bead of magnetic material, such as ferrite or powdered iron, which is placed in inductive relation around the conductor connecting the anode of the Schottky diode and the secondary output winding, as shown more clearly in FIG. 5. FIG. 5 illustrates in perspective form the use of a hollow sleeve 300 of magnetic material which is disposed in a single turn relationship around the conductor 302 connecting the anode 304 of the Schottky diode 306 to an electrical circuit. Referring again to FIG. 3, similar sleeves of magnetic material are disposed between the anodes of each Schottky diode 194, 196, 198 and 200 and one end of the secondary windings 186, 188, 190 and 192, respectively, of the output transformer 160, as generally indicated by inductance symbols 202, 204, 206 and 208. The type of material as well as the length and cross sectional dimensions of the hollow sleeve are chosen to provide a suitable high impedance at the harmonics of the 20 kHz switching frequency sufficient to adequately protect the Schottky diode from damaging reverse overvoltages. Since the use of hollow magnetic sleeves is well known, the calculations necessary to determine the particular length and cross sectional dimensions of each sleeve, required to provide a predetermined magnitude of inductance, will not be described in detail. It has been found that the use of a hollow sleeve of magnetic material disposed around the conductor connected to the anode of a Schottky diode provides a small inductance that effectively protects the Schottky diode from reverse overvoltages in the same manner as the prior art series resistor-capacitor circuit in shunt with the diode and, at the same time, utilizes fewer components and is significantly more energy efficient.

Referring again to FIG. 3, the cathodes of the diode means 194, 196, 198 and 200 are connected to a filter choke network, generally indicated by reference numbers 210, 211A, 211B and 213. According to the preferred embodiment of this invention, filters 210, 211A and 211B are formed by a magnetic core having a plurality of windings disposed in inductive relation therewith. Each filter choke 210 is formed of nine winding turns, with each filter choke 211A and 211B consisting of a single winding turn about the magnetic core. The filter choke network eliminates the ripple from the output voltage of the output transformer 160, thereby providing on conductor 212 a regulated D.C. output voltage of the desired magnitude, such as +5 volts. A zener diode 214 is provided between conductor 212 and ground in order to protect the voltage regulator 10 from being inadvertently connected to supply voltages that exceed its maximum rating.

Figure 4:
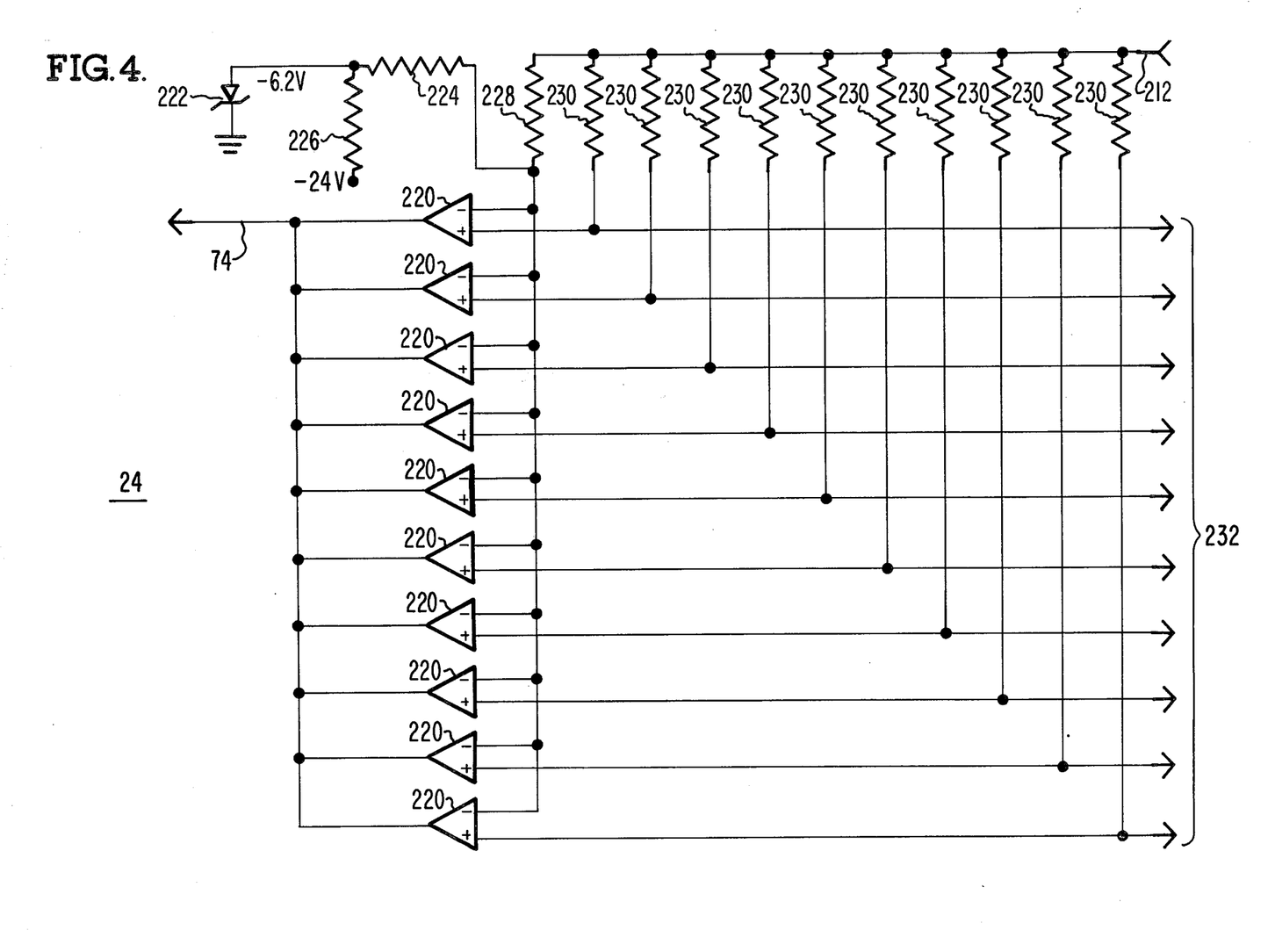
FIG. 4 is a detailed schematic diagram of the overcurrent sense circuitry shown in FIG. 1.

Referring now to FIG. 4, there is shown a detailed schematic diagram of the overcurrent sense circuitry 24. The overcurrent sense circuitry includes a plurality of comparators, generally indicated by reference numeral 220, each having on and off output states. The inverting (−) input of each comparator 220 is connected to a reference voltage circuit consisting of zener diode 222 and a resistor divider network formed by resistors 224 and 226 and also to the output voltage from the filter 22, FIG. 3, carried on conductor 212 through resistor 228. Due to high current requirements of the present application, ten comparators 220 are utilized with ten outputs to divide the output current. It will be understood that different applications involving lower current requirements may use fewer comparators for overcurrent sensing. The non-inverting (+) input of each comparator 220 is connected through a resistor 230 to the conductor 212 carrying the output voltage from the filter section 22 of the voltage regulator 10. According to the preferred embodiment of this invention, resistors 230 have approximately 1 milliohm of resistance. Thus, the inverting (−) input of each comparator 220 has an input signal thereon which is 6.2 millivolts less than the output voltage carried on conductor 212. In operation, an overcurrent condition on one of the outputs 232 connecting the voltage regulator 10 to the utilization devices 14 will cause a voltage drop greater than 6.2 millivolts through the appropriate resistor 230, thereby causing the output of the appropriate comparator 220 to go to ground.

Referring again to FIG. 2, the use of the overcurrent sensing circuitry to alter the output of the voltage regulator 10 will now be described in conjunction with the pulse width modulator circuitry 30. When an overcurrent condition is sensed, as indicated by a ground on the output of one of the comparators 220, shown in FIG. 4, conductor 74 will go to ground potential thereby forward biasing diode 76 and causing the voltage at the junction 68 at the output of the error amplifier 62, which has a high, several megaohms, output impedance, to be lowered towards ground. The resistor 70 - capacitor 72 series network acts as an integrator in averaging the changing magnitude of the voltage appearing at junction 68. This analog signal is feedback through appropriate feedback means, such as resistor 66, to the inverting (−) input of amplifier 62 in order to modify the gain of the amplifier 62. In this manner the input voltage to the amplifier 62 is lowered which, in turn, causes the magnitude of the output voltage to be further decreased in a linear fashion. This linear reduction in the output of the amplifier 62 causes the output voltage and current of the voltage regulator 10, through the driver and output circuitry described above, to be linearly reduced until the overcurrent condition is eliminated.

Table I, shown below, illustrates representative component values used in a typical embodiment of the present invention as described with reference to FIGS. 2, 3 and 4. These values are representative only and in no way constitute any limitation upon the present invention.

TABLE I

| Component | Reference No. | Value or Designation |
|---|---|---|
| Regulating Pulse Width Modulator | 30 | Silicon General Inc., Model No. SG1524 |
| Transistors | 80 | 2N4208 |
| Transistors | 82 | 2N930 |
| Transistors | 120,122 | 2N4895 |
| Transistors | 140,142 | 2N3715 |
| Transistors | 144,146 | 2N3792 |
| Comparators | 84,86,220 | LM339 |
| Diode | 76 | 1N4154 |
| Schottky diodes | 194,196,198,200 | SD51 Schottky |
| Zener diode | 214 | 5V TRANSORB |
| Zener diode | 222 | 6.2V Zener |
| Diodes | 174,176,178,180 | 1N4001 |
| Transformer | 160 | Magnetics Inc., Model No. ZF-43813-TC; 11:4 turns ratio |
| Transformers | 100,102 | Magnetics Inc., Model No. EP17, 120:11 turns ratio |
| Inductors | 202,204,206,208 | Stackpoole Carbon, #57-0049 shielding bead, 0.95–1.75 microhenries |
| Inductors | 210 | Core-Magnetics Inc., Model No. 55924, #210- 9 turns each trifiliar #211 - 1 turn each octafiliar |
| Inductors | 211 | |
| Capacitors | 35,72 | 0.1 microfarads |
| Capacitors | 38,61,148,150 | 0.01 microfarads |
| Capacitors | 81 | 100 picofarads |
| Capacitors | 147,149 | 6.8 microfarads |
| Capacitors | 182,184 | 4 microfarads |
| Capacitors | 213,215 | 2200 microfarads |
| Resistors | 52,75,79,89,224 | 10K ohms |
| Resistors | 83 | 15.8K ohms |
| Resistors | 85 | 1050 ohms |
| Resistors | 87 | 4990 ohms |
| Resistors | 49,49A,76,226 | 1000 ohms |
| Resistors | 63,65,69 | 5050 ohms |
| Resistors | 67 | 1680 ohms |
| Resistors | 66 | 100K ohms |
| Resistors | 70 | 4700 ohms |
| Resistors | 78 | 2870 ohms |
| Resistors | 121,123 | 100 ohms |
| Resistors | 125,127 | 82 ohms |
| Resistors | 228 | 21.5 ohms |
| Resistors | 230 | 1 milliohms. |

In summary, there has been disclosed herein a new and improved voltage regulator which provides a precisely regulated D.C. voltage at its output. The voltage regulator includes a driver transistor switch which periodically supplies energizing current to the primary of a driver transformer. The primary current induces current in the secondary windings of the driver transformer which triggers output transistor switches connected thereto into conduction so as to supply energizing current to the primary windings of an output transformer. A capacitor is connected in parallel with the primary winding of the driver transformer to provide a low dissipation path when the reversal of the polarity of the primary and secondary windings of the driver transformer occurs due to the driver transistor switch current dropping to zero so as to reduce the stored base charge on the output transistor switch means thereby decreasing the turnoff time of the output transistor and improving the efficiency of the voltage regulator.

The primary windings of the output transformer are connected together to form a common junction. Capacitors are connected between the common junction of the primary windings and the positive and negative voltage supply conductors to form a virtual ground at the common junction which cancels input current switching transients and reduces noise generation. The outputs of the secondary windings of the output transformer are connected to Schottky diodes arranged in a full-wave, center-tapped rectifier configuration. Hollow sleeves of magnetic material are disposed around the conductor conducting the secondary windings to the anode of the Schottky diode and provide a small inductance in series with the Schottky diode that protects the Schottky diode from transient reverse overvoltages exceeding the maximum limits of the diode. Overcurrent sensing means are provided wherein comparators generate an error signal when an overcurrent condition exists at the output of the voltage regulator. The error signal is fed back to the switching regulator controller which linearly decreases the output voltage of the voltage regulator through the driver and output circuits until the overcurrent condition is removed.

What is claimed is:

1. A voltage regulator having current limiting circuitry and receiving an unregulated input voltage from an electrical energy source and supplying a regulated D.C. voltage at its output, said voltage regulator comprising:

an operational amplifier means having an inverting input terminal, a noninverting input terminal and an output terminal, said operational amplifier having a substantially high output impedance;

reference voltage circuit means, connected as an input signal to said noninverting input terminal of said operational amplifier, for providing a reference voltage thereto;

power amplifier controlling means, connected to said electrical energy source and said output terminal of said operational amplifier means, for providing a regulated DC output voltage at its output;

means for connecting said output of said power amplifier controlling means as an input signal to said inverting input terminal of said operational amplifier means, with said operational amplifier providing at its output terminal an output signal that is the difference between said two input signals connected thereto;

overcurrent detection means, having on and off states, for detecting when the current drawn by a load exceeds a predetermined magnitude, said output of said overcurrent detection means being connected to said output terminal of said operational amplifier, said overcurrent detection means being operative to lower the magnitude of the output voltage of said operational amplifier means when said current drawn by said load exceeds said predetermined magnitude;

integrating means, connected to said output terminal of said operational amplifier means, for providing an average value of said magnitude of said output voltage of said operational amplifier means; and feedback means, connected between said output terminal and said inverting input terminal of said operational amplifier means, for feeding back a portion of the magnitude of said output voltage of said operational amplifier means so as to modify the gain of said operational amplifier and cause a linear reduction in said magnitude of said output voltage of said operational amplifier means which acts, through said power amplifier controlling means, to linearly reduce the magnitude of the output current of said voltage regulator to a level sufficient to remove said overcurrent condition.

2. The voltage regulator of claim 1 wherein the feedback means includes resistance means.

3. The voltage regulator of claim 1 wherein the integrating means is a resistor-capacitor series network connected between the output terminal of the operational amplifier means and ground.

4. The voltage regulator of claim 1 wherein the overcurrent detection means includes:
a comparator means having an inverting input terminal, a noninverting input terminal and an output terminal;
a reference voltage circuit means, connected to said inverting input terminal of said comparator means, for providing a reference voltage thereto;
the output of the power amplifier controlling means connected to said noninverting input terminal of said comparator means; and
said comparator having on and off states for, when in said on state, providing an output signal indicating when the current drawn by a load exceeds a predetermined magnitude.

* * * * *

UNITED STATES PATENT AND TRADEMARK OFFICE
CERTIFICATE OF CORRECTION

PATENT NO. : 4,218,647
DATED : August 19, 1980
INVENTOR(S) : Frank J. Haas

It is certified that error appears in the above—identified patent and that said Letters Patent is hereby corrected as shown below:

Abstract, lines 22 and 23, "through a resistor to the gain of the operational amplifier" should read -- through a resistor to the input of the operational amplifier so as to modify the gain of the operational amplifier --.

Signed and Sealed this

Twentieth Day of January 1981

[SEAL]

Attest:

Attesting Officer

RENE D. TEGTMEYER

Acting Commissioner of Patents and Trademarks